May 10, 1960  R. M. ANDERSON  2,936,037
HYDRAULIC CONTROL SYSTEM
Filed Feb. 25, 1959  5 Sheets-Sheet 1

Inventor
Reynold M. Anderson
By James O. Olson
Attorney

Inventor
Reynold M. Anderson
Attorney

United States Patent Office 2,936,037
Patented May 10, 1960

2,936,037

HYDRAULIC CONTROL SYSTEM

Reynold M. Anderson, Cedar Rapids, Iowa, assignor to Allis-Chalmers Manufacturing Company, Milwaukee, Wis.

Application February 25, 1959, Serial No. 795,509

18 Claims. (Cl. 180—79.2)

This invention relates generally to a fluid pressure system and is more particularly concerned with control valving for each of a pair of fluid motor systems wherein one of the fluid motor systems is to be automatically activated upon actuation of the other fluid motor system.

This invention may be readily adapted for use on a self-propelled earth moving vehicle of the type having a two axle tractor unit articulated with a single axle trailing unit which is designed to operate as either a three axle or a two axle vehicle. A vehicle of this sort is disclosed in the copending application of H. W. Rockwell et al. Serial No. 798,646, filed March 11, 1959, entitled Articulated Self-Propelled Earth Moving Vehicle.

During three axle operation, this type of vehicle is capable of relatively high speed transportation and is guided in the usual manner by the steerable front wheels of the tractor. In order to convert the vehicle for two axle operation, a hydraulic jack is interposed between the tractor unit and trailer unit which is operative to tilt the tractor relative to the trailer about a transverse horizontal pivot axis thereby transferring weight onto the tractor's driving wheels. When tilting occurs to such a degree, that the steerable tractor wheels are raised out of frictional contact with the ground the vehicle has in effect been converted into a high traction two axle unit.

To guide the vehicle during two axle operation, a wagon type steering system is provided. This type of steering system includes a double acting hydraulic jack operatively interposed between the tractor and trailer units in order to control their angular relationship about a vertical pivot axis.

It will be obvious that in a vehicle of this type it is necessary to provide positive trouble free steering at all times. To achieve this, the changeover from tractor front wheel steering to wagon type auxiliary steering must be instantaneous. It has been suggested that such an instantaneous changeover might be accomplished by providing a hydraulic system wherein the auxiliary steering jack and the weight transfer jack are permitted to "float" during three axle operations and when the weight transfer jack is actuated to raise the tractor front wheels out of steering engagement with the ground the jack for controlling the auxiliary wagon type steering system is to be automatically activated. However, it should be borne in mind that to be commercially feasible the control valving for such a hydraulic system must be compact and have a simplicity of construction with as few components as possible.

It is, therefore, an object of the present invention to provide a hydraulic system for the type of vehicle described which will take care of the requirements as outlined herein in an entirely satisfactory manner.

It is a further object of this invention to provide control valving for a hydraulic system wherein two fluid motors may be controlled separately, but one of the motors may not be operated without activating the other.

It is a further object of this invention to provide a hydraulic system for the type of vehicle hereinbefore described wherein the control valving is so synchronized that the control valve for actuating the weight transfer fluid motor to raise the tractor front wheels off the ground automatically activates the valve system that controls the auxiliary steering fluid motor.

It is a further object of this invention to provide a hydraulic system including a double spool hydraulic control valve wherein each spool operates a separate valve system for controlling a separate fluid motor means, the valve systems being interrelated whereby a "float" position for both of the fluid motor means is controlled by one of the valve spools.

It is a further object of the present invention to provide a hydraulic system for a vehicle of the type hereinbefore described wherein a control valve system for controlling the weight transfer jack incorporates a "float" position for the auxiliary steering jack in addition to the weight transfer jack thereby eliminating the necessity for a "float" position in the auxiliary steering valve system; and wherein the auxiliary steering valve system is automatically placed in a "hold" position whenever the weight transfer valve system is actuated to raise the tractor front wheels off the ground.

These and other objects and advantages will become apparent when the following description is read in connection with the appended drawings in which.

Figures 1, 2, 3, 4:
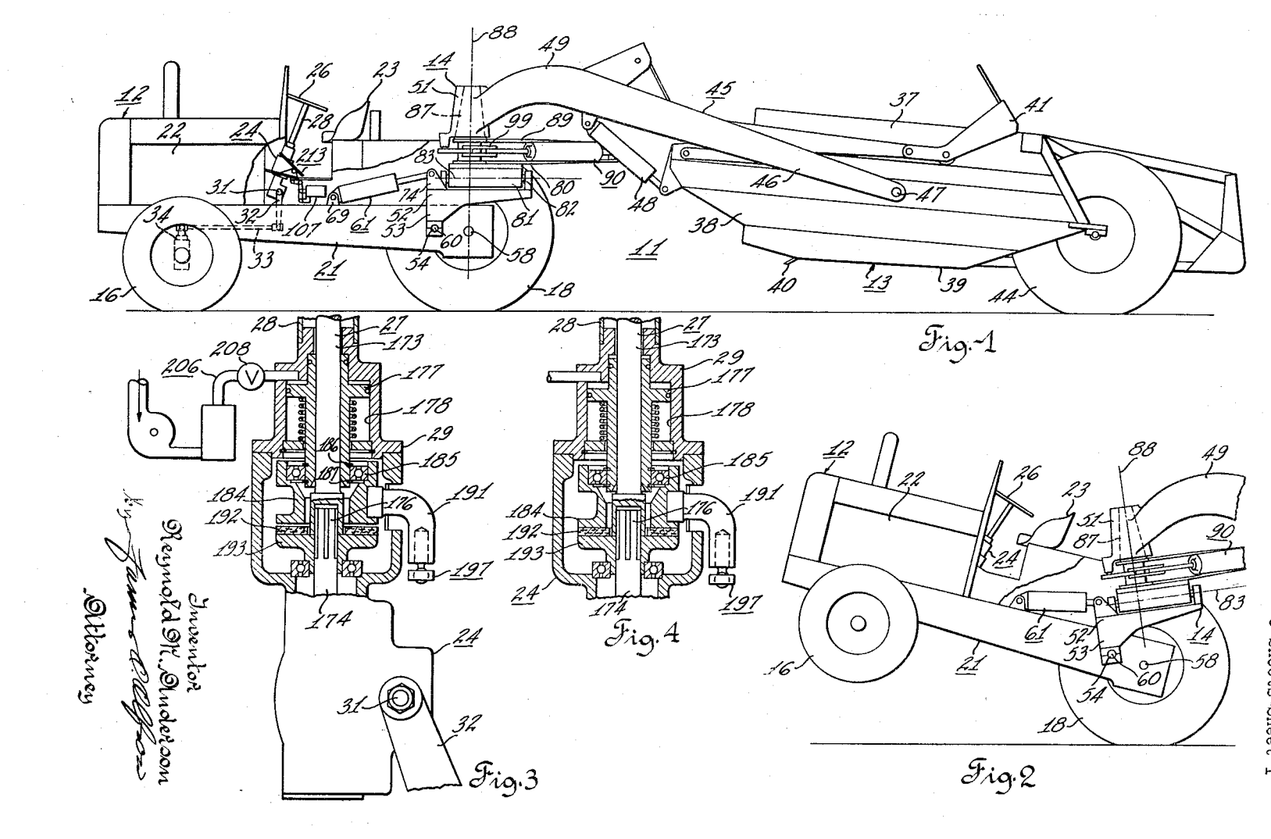
Fig. 1 shows a schematic side view of a two axle tractor unit articulated with a single axle scraper unit and having a portion of the tractor body cut away to show details of the hitch mechanism.
Fig. 2 shows the tractor unit of Fig. 1 in a weight transfer or tilted position with respect to the scraper unit and having the front wheels raised off the ground, a portion of the tractor body being cut away to show the disposition of the hitch mechanism between the tractor and scraper.
Fig. 3 shows the manually operated steering apparatus for guiding the tractor's steerable front wheel and also for controlling the wagon type auxiliary steering system, with the air pressure system for activating the auxiliary control mechanism being diagrammatically shown.
Fig. 4 shows a sectional view of the manual steering apparatus in Fig. 3 with the auxiliary steering control mechanism in the activated condition.
Figures 5, 6:
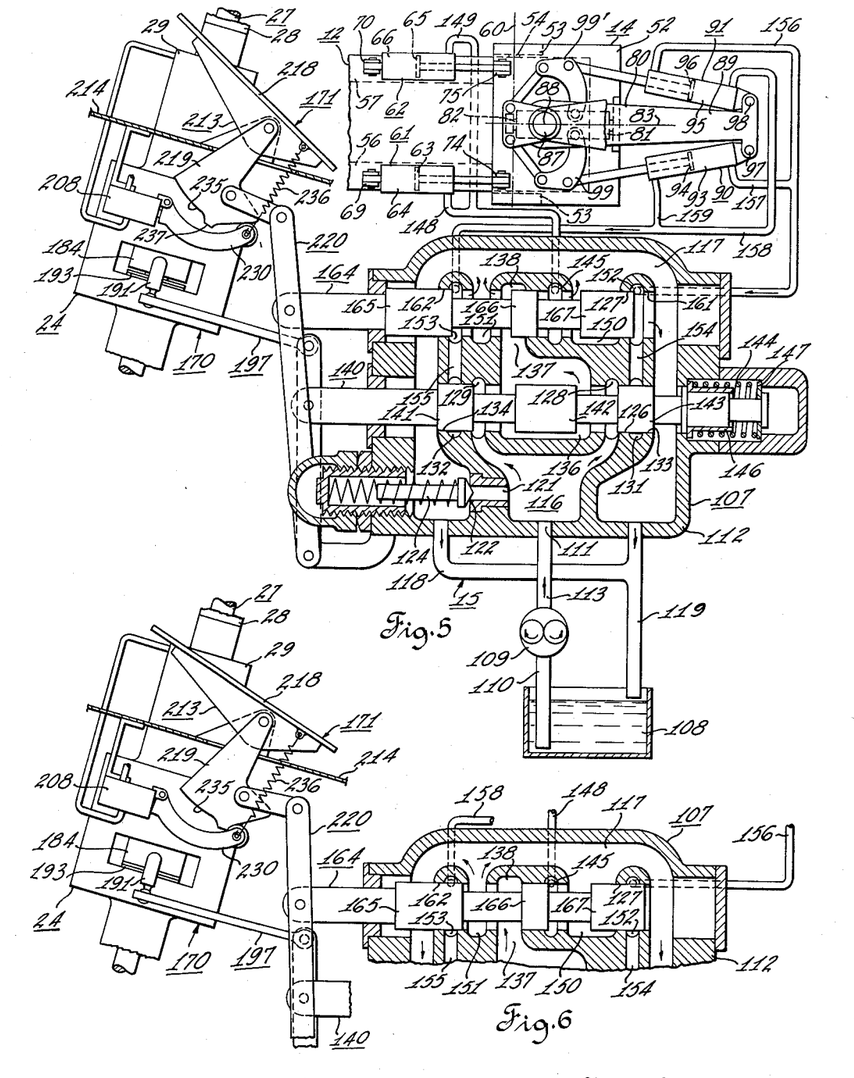
Fig. 5 shows the hitch mechanism for the vehicle of Fig. 1 and also shows a diagrammatic view of the hydraulic system including the weight transfer and auxiliary steering jacks and the control valving therefore with the weight transfer valve system disposed in the steering and weight transfer "float" position.
Fig. 6 shows the weight transfer valve spool shifted to the right automatically placing the steering valve system of Fig. 5 in the "hold" position with the weight transfer system remaining in the "float" position.

Referring to Figs. 1, 2 and 5, the new and useful fluid pressure system that will be disclosed and claimed herein is particularly adapted to be combined with the articulated self-propelled earth working vehicle 11. This vehicle is designed to be operated as a three axle vehicle at higher speeds and low traction requirements and as a two axle vehicle at lower speeds and high traction requirements. Vehicle 11 is comprised of a tractor unit 12 which is articulated with a scraper unit 13 by means of a hitch mechanism 14. The relationship of the fluid pressure system 15 (best shown in Fig. 5) and the hitch mechanism 14 will be described in detail hereinbelow.

Referring to Figs. 1 and 2, tractor unit 12 is a two axle type particularly suited for drawing scraper 13 and includes a pair of front inflated rubber tired dirigible steering wheels 16 (only one of which is shown) and a pair of inflated rubber tired driving or traction wheels 18 (only one being shown). The tractor wheels are carried on the main frame 21 in the conventional manner. Main frame 21 of the tractor is a unitary structure which carries a forward mounted engine 22; a conventional power train for driving the traction wheels 18 which includes transmission and differential gearing (not shown); and an operator's station 23.

Tractor 12 is guided by means of steerable wheels 16 which are controlled by a steering mechanism 24 (shown also in Figs. 3 and 4). Steering mechanism 24 includes the usual steering hand wheel 26 which is fixed on a steering post or shaft 27 (best shown in Figs. 3 and 4) that is carried within a steering column 28 attached on a housing 29 which in turn is supported on the tractor main frame 21. Output or rock shaft 31 is journaled in housing 29 and is drivingly connected with the manually operable steering shaft 27 by means of the conventional worming gearing (not shown). A pitman arm 32 is carried on rock shaft 31 and is connected by means of a connecting rod 33 with the steering knuckle assembly 34 which is of the well known Ackerman type. A power assist (not shown) may be incorporated into the Ackerman steering linkage in the conventional manner for augmenting the steering of the dirigible tractor wheels 16.

Referring to Fig. 1, the scraper unit is of the well known single axle type having an earth receiving bowl 37; a pair of laterally opposite side walls 38 (only one of which is shown); and a bottom 39 which at its forward end is provided with a cutting blade 40. The rear of the bowl 37 is normally closed by the ejector 41 which is adapted to be moved forward through the bowl to discharge, in the conventional manner, material that has been collected therein. The front of the scraper bowl is closed by an apron (not shown) which is also of conventoinal design being pivoted to the ejector 41 and movable between a lowered or closed position and a raised or opened position.

Bowl 37 is supported adjacent its rearward end by a pair of transversely spaced inflated rubber tired ground engaging wheels 44 (only one of which is shown). The forward end of bowl 37 is supported by a yoke or draft frame 45 which includes a pair of side arms 46 (only one being shown) pivotally connected respectively to the side walls 38 by means of pins 47 only one of which is shown. Bowl 37 is adapted to be lowered into a loading position and raised to a travel position in the usual manner by means of a double acting hydraulic jack 48. The forward end of the draft frame 45 is provided with the conventional gooseneck 49, the forwardmost portion of which carries a king pin housing 51 for connecting the scraper unit 13 with the hitch mechanism 14.

Referring to Figs. 1, 2 and 5, hitch mechanism 14 is designed to permit the tractor 12 to be articulated with the scraper 13 about a vertical, a transverse horizontal and a longitudinal pivot axis. Hitch mechanism 14 comprises a base plate member 52 having a pair of journal brackets 53 connected by means of pins 54 on the opposite lateral beams 56 and 57 of the tractor main frame 21. Pins 54 are positioned forwardly of and slightly above the rear axle 58 of the tractor and share a common horizontal axis, indicated by the reference numeral 60 (best known in Fig. 5), and extending transversely of the tractor, about which plate 52 may swing.

A pair of single acting hydraulic weight transfer jacks 61 and 62, which are part of the hydraulic system, are operatively interposed respectively between the tractor main frame 21 and the bast plate 52. Jack 61 is expansible and contractible and includes a ram element 63 which is extendible and retractable within cylinder element 64; and jack 62 similarly includes a ram element 65 which is extendible and retracable within cylinder element 66. Cylinders 64 and 66 are respectively pivotally connected to the tractor main frame side beams 56 and 57 at 69 and 70; and the rams 63 and 65 are pivotally connected respectively to opposite sides of the base plate 52 at 74 and 75. Although the base plate 52 is free to pivot about pivot axis 60, it may be restrained by action of the weight transfer jacks 61 and 62.

The combination of jacks 61 and 62 with the tractor main frame and with the hitch mechanism in effect comprises a weight transfer system. The operation and control of this system will be described in further detail hereinbelow in conjunction with hydraulic system 15. It is also to be understood that the reference to jacks 61 and 62 as being single acting is not intended to unnecessarily limit the invention. For instance, it is well known in the art that a double acting jack may be connected into a hydraulic system in such a manner that one end of the cylinder is in permanent communication with a sump or reservoir and the other end is connected so as to receive pressurized fluid from a control valve. A double acting jack connected thusly is obviously operative as a single acting fluid motor.

A second hitch member 80 includes a sleeve portion 81 which is carried on the base plate 52 by means of pin 82 which provides a horizontal pivot axis 83 extending longitudinally of tractor 12. Hitch member 80 is free to oscillate about axis 83 through a limited arc. An upstanding king pin 87 is rigidly carried on the sleeve portion 81 and provides a vertical pivot axis 88 which is perpendicular to pivot axis 83. The king pin 87 is journaled by suitable bearings within king pin housing 51 of the draft frame to permit relative angling of the scraper unit with respect to the tractor unit about pivot axis 88.

An elongated subframe structure 89 is rigidly connected on the sleeve portion and extends rearwardly of the king pin 87 and underneath the arc of gooseneck 49. Subframe 89 carries a pair of double acting hydraulic steering jacks 90 and 91 that serve as the motor means for the auxiliary wagon type steering and are hydraulically locked automatically by the hydraulic system whenever the weight transfer system is engaged to convert the tractor and scraper into a two axle vehicle.

The hydraulic cylinders 93 and 95 of jacks 90 and 91 are pivotally connected respectively in thrust transmitting relationship with the rearward portion of the subframe 89 by means of vertical pivot pins 97 and 98. Rams 94 and 96 respectively are relatively expansible and contractible with cylinders 93 and 95 and are connected respectively to the king pin housing by means of the thrust transmitting linkages 99 and 99'.

The structural details and arrangement of linkages 99 and 99' and their coaction with hydraulic steering jacks 90 and 91 are disclosed in the copending application of H. W. Rockwell Serial No. 628,593, filed December 17, 1956, now Patent No. 2,885,022. The advantage of this particular mounting arrangement for hydraulic steering jacks is that it permits angling between the tractor and scraper of approximately 90 degrees on either side of the straight ahead operating position. It should be understood, however, that it is not intended to limit the invention to the details of this type of linkage as any means for operatively interposing the double acting auxiliary steering jacks in thrust transmitting relationship between hitch member 80 and the scraper draft frame 45 will be satisfactory for carrying out the invention.

The combination of jacks 90 and 91 with the hitch mechanism and with the draft frame of the scraper in effect comprise an auxiliary wagon type steering system. The control and operation of this system will be described in further detail hereinbelow.

Referring to Fig. 5, the hydraulic pressure system 15 is especially adapted for coordinating the operation of the weight transfer system with the operation of the auxiliary wagon type steering system. This is accomplished by means of a two spool hydraulic control valve 107 which in effect has two separate control valve systems, one serving a weight transfer valve system for controlling the single acting weight transfer jacks 61 and 62 and the second serving as a steering valve system for controlling the operation of the auxiliary steering jacks 90 and 91.

The hydraulic system 15 comprises a hydraulic fluid reservoir 108, an engine driven hydraulic pump 109 which receives fluid from the reservoir by means of an intake conduit 110. Pump 109 delivers pressurized hydraulic fluid to the pump port 111 of a two spool control valve housing 112 by means of conduit 113. Pump port 111 in turn communicates with an inlet chamber 116 formed within housing 112. An exhaust passage 117 is formed by the interior walls of valve housing 112. Hydraulic fluid is returned from exhaust passage 117 to reservoir 108 by means of return conduits 118 and 119.

Interconnecting the inlet chamber 116 and exhaust passage 117 is a relief passage 121 having a relief port 122 for seating a spring loaded relief valve 124. Relief valve 124 is of the conventional design and construction and serves to prevent an undesirable pressure build up by opening the inlet chamber 116 for fluid communication with the exhaust chamber 117 in response to excessive pressure within chamber 116.

A pair of spaced parallel valve spool bores 126 and 127 are formed respectively within housing 112. Valve spool bore 126 is a basic part of the auxiliary steering control valve system and has formed therein a pair of spaced annular inlet ports 128 and 129 which are located intermediate a pair of annular load ports 131 and 132 which in turn are formed intermediate a pair of exhaust ports 133 and 134 formed respectively at the intersection of the bore 126 and the exhaust chamber 117. An annular outlet port 136 is formed within bore 126 intermediate inlet ports 128 and 129. Port 136 is connected by a cross passage 137 with an annular inlet port 138 formed within bore 127.

Axially slidably received in bore 126 is an elongated valve spool 140 having a series of land portions 141, 142 and 143 formed thereon for controlling interport flow within bore 126 in the usual manner. A biasing spring 144 is carried on one end of spool 140 and is confined between slidable sleeve 146 and flange member 147. Sleeve 146 and flange 147 in turn transmit thrust between the valve spool and housing 112 to effectively center spool 140 in the position shown in Fig. 5.

Bore 127 is a basic part of the weight transfer control valve system and has an annular load port 145 formed therein adjacent to inlet port 138. Port 145 is interconnected for fluid communication with cylinders 64 and 66 of weight transfer jacks 61 and 62 by means of conduits 148 and 149. A pair of annular exhaust ports 150 and 151 are formed respectively within bore 127 on the outside of ports 138 and 145 and communicate respectively with exhaust passage 117. On the outside of ports 150 and 151 and within bore 127 are formed a pair of annular relay ports 152 and 153. Ports 152 and 153, respectively, are cross connected for communication with load ports 131 and 132 by means of cross connecting passages 154 and 155 formed within housing 112. Both of ports 152 and 153 are also cross connected for fluid communication with one end of each of cylinders 93 and 95 respectively by means of conduits 156 and 157, and conduits 158 and 159. By means of passages 154 and 155 and relay ports 152 and 153 load ports 131 and 132 of bore 126 have fluid communication with jacks 90 and 91. A second pair of exhaust ports 161 and 162 are formed respectively at the intersection of bore 127 with exhaust passage 117.

An elongated valve spool 164 having land portions 165, 166 and 167 is axially slidably carried within bore 127 for controlling interport flow therein in the usual manner. Because relay ports 152 and 153 and load ports 145 are all located within the valve bore 127, valve spool 164 is operative to control a "float" and a "hold" position for the auxiliary steering jacks 90 and 91, as well as the weight transfer jacks 61 and 62 which will be more fully explained hereinbelow.

Referring to Figs. 3, 4 and 5, the manually actuated vehicle steering and control apparatus 170 comprises a weight transfer actuating mechanism 171 and a steering mechanism 24. Actuating mechanism 171 provides a means for manually adjusting the weight transfer valve spool 164 to operate the weight transfer jacks 61 and 62. Steering mechanism 24 provides a means for guiding the tractor front wheels in a conventional manner during three axle operations of the vehicle, and also incorporates an auxiliary steering actuating device for adjusting the steering valve spool 140 which controls steering jacks 90 and 91.

Apparatus 170 is also disclosed in the copending application of H. W. Rockwell Serial No. 801,221, filed March 23, 1959, entitled Vehicle Steering and Control Apparatus. Although apparatus 170 provides a convenient means for manually actuating spools 140 and 164 of control valve 107, it is not intended to limit this invention to the structural details of apparatus 170.

Referring to Figs. 3 and 4, steering shaft 27 includes an upper shaft 173 one end of which is journaled within housing 29 by suitable bearings and is drivingly connected with a lower shaft 174 by means of a splined connection at 176. Shaft 174 is suitably journaled within housing 29 and is drivingly connected with rock shaft 31 by means of conventional worm gearing (not shown).

A fluid pressure cylinder 178 is formed by the interior walls of housing 29 and is coaxial with the steering shaft 27. A piston member 177 is slidably carried within cylinder 178. A clutch member 184 is rotationally carried on piston member 177 by means of ball bearings 185 and is held in axially fixed thrust transmitting relationship therewith by means of retainer rings 186 and 187. Integrally fixed on clutch member 184 is an auxiliary steering actuating lever 191 which is operative to transmit rotational motion to adjust the axial displacement of valve spool 140. A second clutch plate 193, having a friction facing 192, is splined on the lower steering shaft 174 and is complementary to and engageable with clutch member 184.

In order to transmit motion from steering wheel 26 to lever 191 clutch members 184 and 193 must be frictionally engaged. Movement of lever 191 is then transmitted to valve spool 140 by means of a motion translating linkage 197 (shown in Fig. 5) whereby rotational movement of steering wheel 26 displaces valve spool 140 in an axial direction.

Referring to Fig. 3, the diagrammatically illustrated air pressure system 206 supplies air under pressure to cylinder 178 for bringing about engagement of clutch members 184 and 193 whereby the auxiliary steering actuating lever 191 is connected for rotation with the manual steering shaft 27. Air pressure system 206 is of the conventional type and includes a control valve 208. Control valve 208 has two positions, open and closed. In the open position valve 208 directs compressed air to cylinder 178 for activating piston 177 to engage clutch members 184 and 193. Valve 208 is biased to the "closed" position and is adjusted to the "open" position by means of the weight transfer actuating mechanism 171. Valve 208 thereby serves to synchronize the manual actuation of the weight transfer valve system with that of the auxiliary steering valve system as will be presently explained in detail.

Referring to Fig. 5, the weight transfer actuating mechanism 171 includes a pedal assembly 213 which is pivotally mounted on the floor plate 214 of the tractor 12. Assembly 213 includes a foot pedal plate 218 which is to be controlled by the operator's left foot. A lever portion 219 of the pedal assembly 213 is integral with pedal plate 218 and extends below floor plate 214 through a suitable opening therein. Pedal assembly 213 is operatively connected with valve spool 164 by means of a motion translating linkage 220 whereby pivotal movement of pedal 218 will displace the weight transfer spool 164 axially within bore 127.

Figure 8:
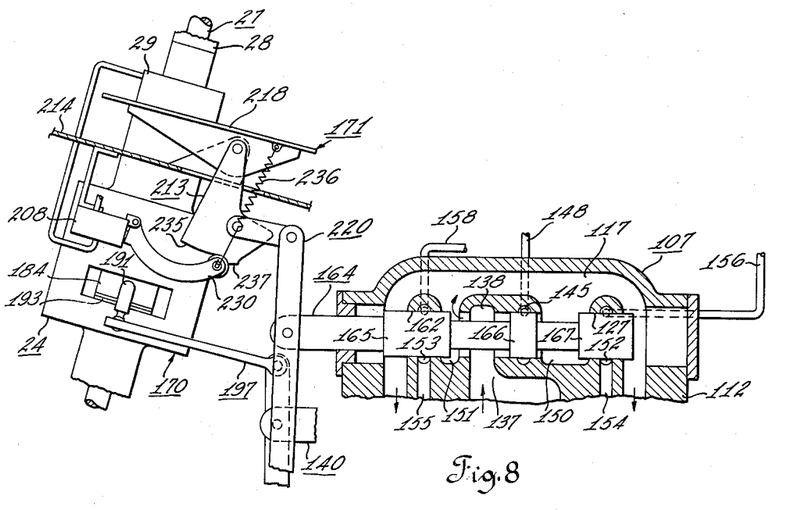
Fig. 8 shows the weight transfer valve spool held by a detent means in an intermediate position with the weight transfer system disposed in a "hold" position which automatically places the steering valve system of Fig. 5 in the "hold" position.

Foot pedal 218 also effectively serves to actuate valve 208 which, as previously mentioned, regulates the compressed air flow to and from air cylinder 178. Valve 208 is actuated by a cam follower 230 which engages a cam 235 formed on lever portion 219. The cam follower is held in thrust transmitting relation with cam 235 by means of a tension spring 236. As pedal assembly 213 is pivoted, valve 208 is manipulated between and open and closed position. Spring 236 is also effective to bias pedal 218 in a nonoperating position as shown in Fig. 5 which corresponds to the steering "float" weight transfer "float" position of spool 164. A projection 237 is formed on the surface of cam 235 and acts as a detent for cam follower 230 so as to hold the pedal assembly 213 in an intermediate control position corresponding to the steering "hold" weight transfer "hold" position of valve spool 164 as shown in Fig. 8.

*Operation*

Referring to Figs. 1, 3 and 5, the steering mechanism 24 and the weight transfer mechanism 170 are shown in the normal position during operation of the tractor and scraper as a threeaxle vehicle. In this condition vehicle 11 is being guided by the tractor's dirigible front wheels 16.

Referring specifically to Fig. 5, the weight transfer valve spool 164 is in the steering "float" and weight transfer "float" position and the steering valve spool 140 is centered within bore 126 in a nonoperating position. Arrows drawn within the passages in valve housing 112 indicate the flow path of power fluid from the pump back to the reservoir. These arrows also indicate that cylinders 64 and 66 of weight transfer jacks 61 and 62 communicate freely with exhaust passage 117 through load port 145 and exhaust port 150; and that both ends of cylinders 93 and 95 of auxiliary steering jacks 90 and 91 communicate freely with the exhaust passage 117 through relay ports 152 and 153, and exhaust ports 151 and 161. In this condition rams 63 and 65, and 94 and 96 are allowed to float in their respective cylinders thereby permitting free articulation of the tractor 12 with respect to the scraper 13 about the vertical pivot axis 88, transverse horizontal axis 60 and longitudinal axis 83.

The fluid pressure control system 15 is so designed that the auxiliary wagon type steering system may be engaged without the tractor front wheels being lifted off the ground. It may be desirable to independently activate the auxiliary steering for example in order to prevent jackknifiing of the tractor and scraper which might occur when operating the vehicle over a slippery roadway. To activate the auxiliary steering control valve system the operator depresses foot pedal 218 until the foot pedal assembly 213 is pivoted to its second position as illustrated in Fig. 6. In this position cam 235 causes cam follower 230 to be pivoted downward thereby actuating the air valve 208 to its open position. In the open position, compressed air is directed through valve 208 to air cylinder 178 causing piston member 179 to be displaced downwardly engaging clutch member 184 with clutch member 193. The steering valve spool 140 may now be manipulated by the hand wheel 26.

Pivoting of pedal assembly 213 to the second position, as shown in Fig. 6, also displaces the weight transfer valve spool 164 axially to the right and to its auxiliary steering "hold" weight transfer "float" position wherein land portions 165 and 167, respectively, close relay ports 152 and 153 from communication with the exhaust passage 117 thereby hydrostatically locking rams 94 and 96 in their respective cylinders 93 and 95. Jacks 90 and 91 are now responsive to the axial adjustment of valve spool 140 which has been automatically placed in a "hold" position by the adjustment of valve spool 164 without spool 140 having been shifted from the setting shown in Fig. 5. Jacks 61 and 62, however, are not affected because valve spool 164 remains in a weight transfer "float" position with load port 145 freely communicating with exhaust passage 117.

In the weight transfer "float" auxiliary steering "hold" condition as illustrated in Fig. 6 the hitch mechanism 14 will permit free articulation of the scraper with respect to the tractor about the transverse horizontal pivot axis 60 and the longitudinal pivot axis 83. The angular relationship of the tractor with respect to the scraper about vertical pivot axis 88 is now positively regulated by means of steering jacks 90 and 91 which are controlled by valve spool 140 which in turn is manipulated by the steering wheel 26.

Upon release of foot pedal 218 from the second position, as shown in Fig. 6, the pedal assembly 213 being biased by spring 236 will return to the first position, as shown in Fig. 5. Simultaneously, valve spool 164 will be returned to the auxiliary stering "float" and weight transfer "float" position shown in Fig. 5; and cam follower 230 will be pivoted upwardly thereby adjusting air valve 208 to the closed position which disengages clutch plates 184 and 193 as shown in Fig. 3.

The weight transfer "float" auxiliary steering "float" position of valve spool 164 may be considered a full "float" position since all of the jacks are free to expand and contract. The auxiliary steering hold and weight transfer "float" position may be thought of as a "semi-float" position of valve spool 164 inasmuch as the steering jacks 90 and 91 are hydrostatically locked and the weight transfer jacks 61 and 62 are free to expand and contract.

Should maximum tractive power be required as when operating the vehicle over difficult terrain or during the cutting and loading operation of the scraper, the tractor and scraper may be converted into a two axle vehicle by manually actuating the weight transfer mechanism in order to raise the tractor front wheels off the ground.

Figure 7:
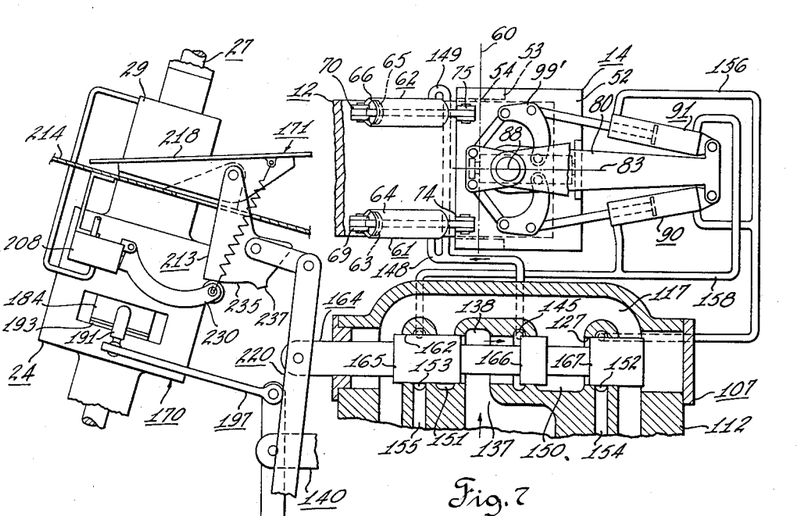
Fig. 7 shows the hitch mechanism and manual actuating apparatus of Fig. 5 with the weight transfer valve spool shifted to the extreme right into the weight transfer "raise" position which automatically places the steering valve of Fig. 5 in the "hold" position.

To initiate weight transfer the foot pedal 218 is depressed to the full actuated position, as shown in Fig. 7, which pivots the pedal assembly 213 and actuates air valve 208 to "open" thereby setting off the chain of events which results in rotationally locking the auxiliary steering lever 191 with steering wheel 26 (shown in Fig. 4) as hereinbefore described.

Referring specifically to Fig. 7, valve spool 140 remains in the centered position as shown in Fig. 5 but the pivoting of pedal assembly 213 has moved valve spool 164 to the extreme right into the weight transfer "raise" position. In the "raise" position pressurized fluid is directed into the weight transfer jacks 61 and 62 as land portions 165 and 166 are operative to connect load port 145 with inlet port 138. In this position inlet port 138 receives pressurized fluid from inlet chamber 116 through passage 137, as shown in Fig. 5. In response to the power fluid, weight transfer jacks 61 and 62 are contracted whereby the tractor is tilted with respect to the scraper about the horizontal transverse pivot axis 60. As will be apparent, the degree of tilting is under the operator's control and if necessary the tractor's front wheels may be raised off the ground as much as thirty inches as shown in Fig. 2.

Referring to Fig. 8, upon release of the foot pedal 218, spring 236 will return pedal assembly 213 to the intermediate position, which corresponds to a weight transfer "hold" steering "hold" position of valve spool 164. The pedal is retained in this position due to the cam follower 230 engaging projection 237 on cam 235. With valve spool 164 disposed in the weight transfer "hold" position, land portion 166 closes load port 145 from communication with the exhaust passage 117 which hydrostatically locks jacks 61 and 62 in the contracted condition whereby the tractor may be held in any preselected degree of tilted condition. By retaining valve spool 164 in the weight transfer "hold" position, valve spool 140 is automatically disposed in the auxiliary steering "hold" position with steering jacks 90 and 91 being hydrostatically locked as was previously explained in conection with Fig. 6.

According to the position of the valve spools and steering lever 191, illustrated in Figs. 6 and 8, vehicle 11 is operating in the straight ahead position with valve spool 164 adjusted so that valve spool 140 is in the auxiliary steering "hold" position. Assuming now that it is necessary to deploy the wagon type auxiliary steering so as to guide the vehicle to the right, steering wheel 26 is turned clockwise, as viewed from the operator's station 23. Movement of steering wheel 26 in this direction simultaneously rotates auxiliary steering lever 191 in a clockwise direction and displaces the steering valve spool 140 to the left and into the "right turn" position, as shown in Fig. 9.

Figure 9:
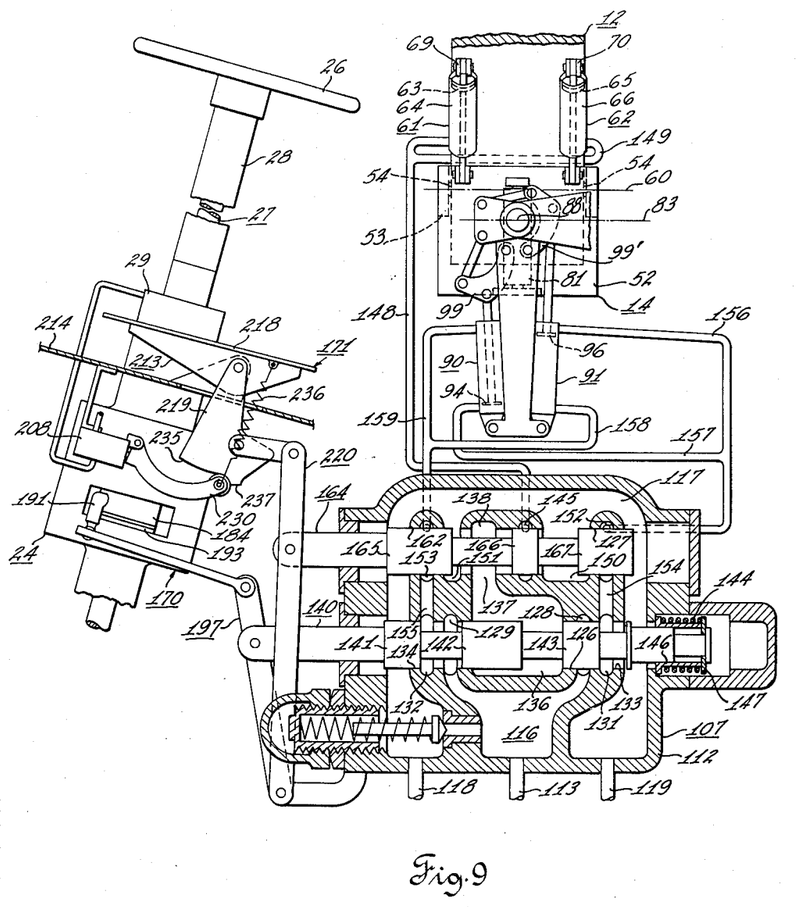
Fig. 9 shows the hitch mechanism and the weight transfer valve and control linkage in the intermediate or weight transfer "hold" position, as shown in Fig. 8, with the steering valve spool being displaced to the extreme left placing the steering valve system and the steering jacks in the "right turn" position.

Referring to Fig. 9, in the "right turn" position inlet port 129 is connected for communication with load port 132 so that pressurized fluid is transmitted through cross connection passage 155 and relay port 153 to the rearward end of cylinder 95 and to the forward end of cylinder 93; and load port 131 is connected with exhaust port 133 so that trapped fluid in the forward end of jack 95 and the rearward end of cylinder 93 may be evacuated to the exhaust passage 117. This results in steering jack 91 being expanded and steering jack 90 being contracted. The reactive force of jacks 90 and 91 is transmitted through linkage 99 and 99' to the scraper causing the tractor unit 12 to be angled to the right about the vertical king pin axis 88.

Although Fig. 9 illustrates the maximum ninety degree angled position to the right, it will be apparent that any desired degree of angling is obtainable by simply releasing the hand wheel allowing spring 144 to center spool 140 in the steering "hold" position. This of course will hydrostatically lock steering jacks 90 and 91 in their respective expanded and contracted conditions.

Figure 10:
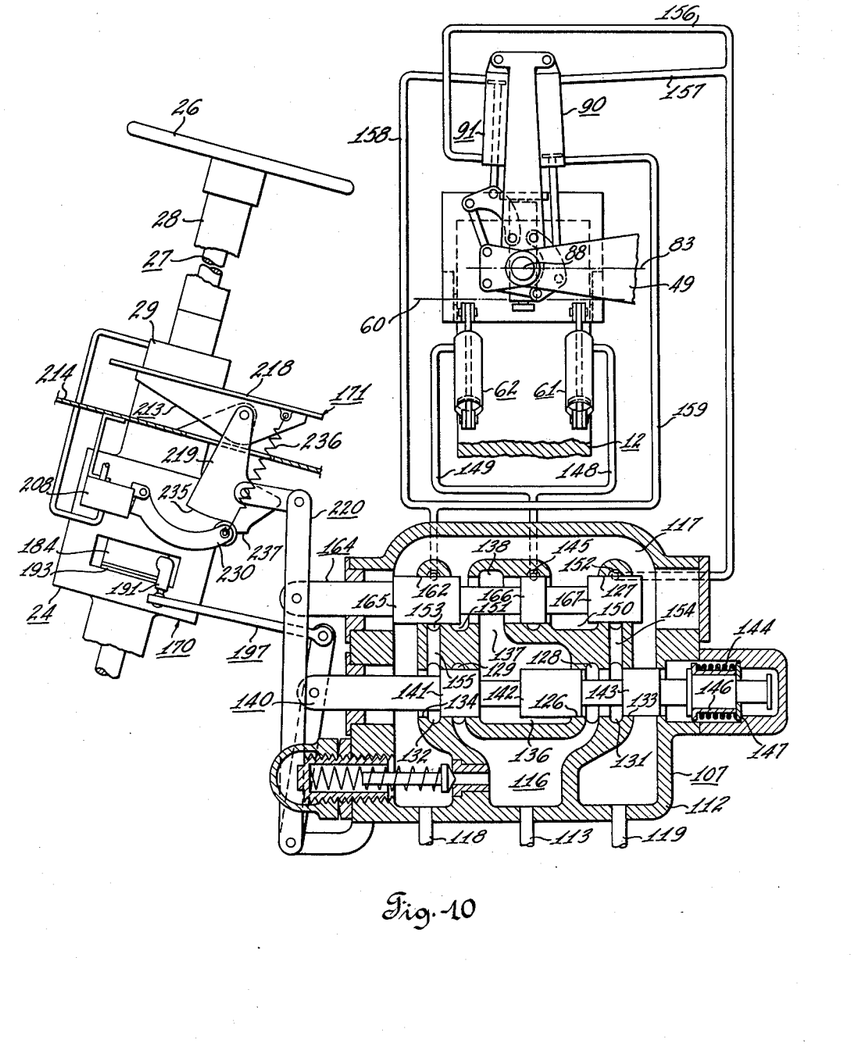
Fig. 10 is similar to Fig. 9 but shows the steering control valve spool and linkage displaced to the extreme right thereby placing the steering valve system and steering jacks in the "left turn" position.

Referring to Fig. 10, when it is necessary to return the two axle vehicle from the "right turn" position to straight ahead operation or to angle the tractor to the left about axis 88, steering wheel 26 is simply turned in a counterclockwise direction. The simultaneous counterclockwise rotation of lever 191 displaces spool valve 140 to the right opening load port 131 for communication with inlet port 128 thereby directing pressurized fluid to the rearward end of cylinder 90 and the forward end of cylinder 91; and connecting load port 132 and exhaust port 134 so that the rearward end of cylinder 91 and the forward end of cylinder 90 communicate with the exhaust passage 117. In this position jack 90 will be expanded and jack 91 will be contracted. If the wheel 26 is held in the left turn position, the tractor unit will swing to the left about pivot axis 88 until it eventually reaches the ninety degree left turn position shown in Fig. 10. Any degree of leftward angling may be obtained by simply returning valve spool 140 to the "hold" position.

In order to return the vehicle from the two axle tilted condition of Fig. 2, to the three axle condition of Fig. 1, foot pedal 218 is simply returned from the intermediate position of Fig. 9 to the first position of Fig. 5 which moves valve spool 164 to the left and opens cylinders 61 and 62 for communication with the exhaust passage 117 as shown in Fig. 5. As foot pedal 218 is returned to the first position, air valve 208 is automatically closed and the auxiliary steering actuating mechanism disengaged so that the three axle vehicle is guided by the steerable front wheels 16 of the tractor under the control of steering wheel 26.

In the particular embodiment of the double spool control valve disclosed herein the land portions on steering valve spool 140 are designed so that outlet port 136 is closed to inlet ports 128 and 129 when the steering valve system is in either a right or left turn position whereby the weight transfer valve system may not receive pressurized fluid from inlet chamber 116. It is not intended, however, to limit the invention to this design as it would be entirely possible to allow flow of pressure fluid to inlet port 138 at all times. It is also contemplated that a separate fluid pressure source for the weight transfer valve system might be provided which would permit simultaneous operation of both the auxiliary steering and weight transfer valve systems without any danger of a sluggish response in either system.

It is also to be understood that this invention is not to be limited to the particular sequence of control positions which are illustrated for the weight-transfer valve spool 164. The sequence disclosed is merely a convenient one which complements the particular manual control apparatus that has been selected to illustrate the invention.

From the foregoing it will be apparent that a new and useful double spool control valve system has been illustrated whereby one of the valve spools controls the "float" and "hold" positions for both valve systems. This feature permits the auxiliary steering valve system to be automatically disposed in the "hold" position whenever the weight transfer valve system is activated. In this way the vehicle is never without positive steering control.

The feature of incorporating a steering "float" position in the weight transfer valve system and eliminating this position from the steering valve system also results in an improved wagon type steering arrangement. For example, if the "float" position were present in the steering valve system there would be a momentary loss of steering control every time the steering valve spool was moved through this position.

Having now particularly described and ascertained the nature of this invention and the manner in which it is to be performed, I declare that what I claim is:

1. In a self-propelled earth moving vehicle of the type having a two axle tractor unit articulated with a single axle trailing unit and being adapted to operate as a three axle vehicle and a two axle vehicle alternatively, a fluid pressure system comprising: a weight transfer fluid motor operatively interposed between said tractor and trailing unit for tilting the former relative to the latter about a horizontal pivot axis extending transversely of the vehicle; an auxiliary steering fluid motor operatively interposed between said tractor unit and trailing unit for controlling relative angling between said units about a vertical pivot axis; fluid pressure means for supplying pressurized fluid; a double valve control means for selectively controlling fluid flow between said pressure means and said fluid motors, said double valve control means including a first control valve system having means for connecting the latter in fluid communication with said weight transfer motor, and a second control valve system having means for connecting the latter in fluid communication with said steering motor; means for conducting power fluid between said double valve control means and said pressure means; and passage means for cross connecting said valve systems whereby said first valve system incorporates a "float" position for both control valve systems permitting free movement of said weight transfer and steering motors, said first valve system also providing a "hold" position to pressure lock said weight transfer and steering motors respectively and an "operating" position for directing power fluid to drive the weight transfer motor, said second valve system having operating positions to operate the steering motor in opposite directions alternatively.

2. In a self-propelled earth moving vehicle of the type having a two axle tractor unit articulated with a single axle trailing unit and being adatped to operate as a three axle vehicle and as a two axle vehicle alternatively, a fluid pressure system comprising: a weight transfer fluid motor operatively interposed between said tractor and trailing units for tilting the former relative to the latter about a horizontal pivot axis extending transversely of the vehicle; a steering fluid motor operatively interposed between said tractor unit and trailing unit for controlling relative angling between said units about a vertical pivot axis; fluid pressure means for supplying power fluid; a double spool control valve means for selectively controlling fluid flow between said pressure means and said fluid motors respectively, said spool valve means including a first control valve system having means for connecting the latter in fluid communication with said weight transfer motor and a second valve system having means for connecting the latter in fluid communication with said steering motor; first and second axially reciprocable valve spool members respectively associated with said first and second valve systems; and passage means for cross connecting said control valve systems whereby said first valve spool is adjustable into a "float" position for exhausting both fluid motors to said pressure system, said first valve spool also being adjustable to a "hold" position for pressure locking said steering motor upon shifting of the first valve spool into the "hold" position, said second valve system being activated wherein said second valve spool is operable to control the flow of power fluid between the pressure means and the steering motor whereby the latter may be driven in opposite directions alternatively.

3. In a self-propelled earth moving vehicle of the type having a two axle tractor unit articulated with a single axle trailing unit and being adapted to operate as a three axle vehicle and as a two axle vehicle alternatively, a fluid pressure system comprising: a weight transfer fluid motor means operatively interposed between said tractor and trailing units for tilting the former relative to the latter about a horizontal axis extending transversely of the vehicle; a double acting steering motor means operatively interopsed between said tractor unit and trailing unit for controlling relative angling between said units about a vertical axis; fluid pressure means for supplying power fluid; a control valve means for selectively controlling fluid flow between said pressure means and said fluid motors, said control valve means including a first valve system having a first inlet port for receiving power fluid from said pressure means, a relay port, a plurality of first exhaust ports, and a first load port, said control valve means also including a second valve system having a second inlet port for receiving power fluid from said pressure means, a second exhaust port for returning fluid to said pressure means, and a pair of second load ports, fluid passage means for interconnecting one of said second load ports and one of said relay ports in fluid communication with each other and with one side of said steering motor means, fluid passage means for interconnecting the other of said second load ports and the other of said relay ports in fluid communication with each other and with the other side of said steering motor means, means for connecting said first load port in fluid communication with said weight transfer motor; a first valve member for controlling interport fluid flow within said first valve system and having a steering "float" position for both said valve systems, in said "float" position said relay ports and said first load port respectively being placed in fluid communication with said first exhaust ports permitting free movement of said steering and weight transfer motor means, said first valve member being operative to close said relay ports from communication with the exhaust ports thereby pressure locking said steering motor means; a second valve member for controlling interport fluid flow within said second valve system, said second valve system being automatically activated upon closing of said relay ports by said first valve member, with said second valve system activated said second valve member being operative to connect one of the second load ports with one of said second inlet ports and the other of said second load ports with the second exhaust port thereby driving the steering motor means in one direction.

4. In a self-propelled earth moving vehicle of the type having a two axle tractor unit articulated with a single axle trailing unit and being adapted to operate as a three axle vehicle and as a two axle vehicle alternatively, a hydraulic system comprising: a single acting weight transfer jack operatively interposed between said tractor and trailing units for tilting the former relative to the latter about a horizontal axis whereby the vehicle may be converted into a two axle unit; a double acting auxiliary steering jack operatively interposed between said tractor and trailing unit for controlling relative angling between said unit about a vertical axis; a pressure means including a pump and reservoir for supplying pressurized hydraulic fluid; a double spool control valve means including a main valve body, a pair of spaced parallel valve spool bores formed in said valve body, and an inlet and an outlet passage formed in said valve body and being connetced respectievly to said pump and reservoir, one of said pair of valve spool bores having a plurality of first exhaust ports in communication with the exhaust passage, a pair of relay ports connected respectively to said steering jack, a first load port connected to said weight transfer jack, and a first inlet port for receiving power fluid, the other of said pair of valve spool bores having a pair of second load ports, a pair of second inlet ports communicating with said inlet passage, and a pair of exhaust ports communicating with said exhaust passage, passage means for cross connecting said pair of relay ports respectively with said pair of second load ports, a weight transfer valve spool carried within said one valve spool bore for directing interport flow therein, said weight transfer spool having a steering "float" and weight transfer "float" position wherein said relay parts and said first load port respectively are placed in fluid communication with said exhaust passage, said weight transfer valve spool also being shiftable into a steering "hold" weight transfer "float" position wherein said relay ports respectively are closed to the exhaust passage while said first load port remains open to the exhaust passage, and an axially reciprocable steering valve spool carried within said other valve bore for controlling interport flow therein, upon shifting of said weight transfer valve spool into the steering "hold" weight transfer "float" position, said steering valve spool being automatically disposed to control flow of power fluid between said pressure means and said steering jack, said steering valve spool having an operating position wherein said pair of load ports respectively are placed in communication with one of said pair of second inlet ports and one of said pair of exhaust ports.

5. The combination set forth in claim 4 with said weight transfer valve spool having a steering "hold" weight transfer "hold" position wherein said relay ports and said first load port respectively are closed to the exhaust passage thereby hydrostatically locking both the steering and weight transfer jacks; an outlet port provided in said other of the valve bores; and passage means within the valve body provided for cross connecting said first inlet port with said outlet port; and with said steering valve spool having a normal position wherein said outlet port is open to said pair of second inlet ports and upon shifting said steering valve spool out of normal and into said operating position said outlet port being closed to said pair of second inlet ports.

6. In a hydraulic system of the type having a single acting fluid motor and a double acting fluid motor, and means including a reservoir and pump for supplying pressurized fluid, a control valve means for selectively controlling fluid flow between said pressure means and said fluid motors, said control valve means comprising: a first valve system including a first valve bore, said bore having a first inlet port in fluid communication with the pressure side of said pump, a pair of relay ports in communication respectively with opposite sides of said double acting fluid motor, a plurality of first exhaust ports in communication with said reservoir, and a first load port in communication with said single acting fluid motor; a second valve system including a second valve bore having an inlet port in fluid communication with the pressure side of said pump, an exhaust port communicating with said reservoir, and a pair of second load ports cross connected respectively with said relay ports in constant fluid communication with one another; a first valve member carried in said first bore for controlling interport fluid flow therein, and having a "float" position, in said "float" position said relay ports and said first load port respectively being placed in fluid communication with said exhaust ports; and a second valve member carried within said second valve bore for controlling interport fluid flow therein, and having a normal position, in said normal position said pair of second load ports being closed to said inlet and exhaust ports respectively, upon closing of said relay ports from communication with said first exhaust ports by said first valve member, said second valve system being automatically activated whereby said second valve member controls fluid flow to and from said double acting fluid motor.

7. In a hydraulic system of the type having single acting fluid motors and a double acting fluid motor, and pressure means for supplying power fluid, a control valve means for selectively controlling fluid flow between said pressure means and said fluid motors, said control valve means comprising: a first valve system including a first valve bore, said bore having an inlet port for receiving fluid from said pressure means, a pair of relay ports respectively in communication with said double acting fluid motor, a plurality of first exhaust ports for returning power fluid to said pressure means, and a first load port in fluid communication with said single acting fluid motor; a second valve system including a second valve bore having a second inlet port for receiving power fluid from said pressure means, an exhaust port for returning fluid to said pressure means, and a pair of second load ports; passage means for cross connecting said pair of second load ports respectively with said relay ports in fluid communication with one another; a first valve member carried within said first valve bore for controlling interport fluid flow therein, and being adjustable from a "float" to a "semifloat" position, in said "float" position said relay ports and said first load port respectively being placed in fluid communication with said exhaust ports and in said "semifloat" position said relay ports being isolated from said first exhaust ports and said first load port being retained in fluid communication with one of said first exhaust ports; and a second valve member carried within said second valve bore for controlling interport fluid flow therein and having a normal position, in said normal position said second load ports respectively being closed to said second inlet and said second exhaust ports, with said first valve member in said "semifloat" position said second valve member is adjustable out of said normal position into an "operating" position wherein said pair of second load ports respectively are placed in communication with one of said second exhaust ports and one of said second inlet ports whereby said double acting fluid motor is driven in one direction.

8. In a hydraulic system of the type having a single acting and a double acting fluid motor, and means including a reservoir and pump for supplying power fluid, a control valve means for selectively controlling fluid flow from said pressure means to said fluid motors, said control valve means comprising: a first valve system including a first valve bore having a first inlet port for receiving power fluid, a pair of relay ports respectively in fluid communication with said double acting fluid motor, a plurality of first exhaust ports communicating with said reservoir, and a first load port in fluid communication with said single acting fluid motor; a second valve system including a second valve bore, said bore having a second inlet port for receiving power fluid, a plurality of exhaust ports communicating with said reservoir, and a pair of second load ports respectively cross connected for fluid communication with said relay ports; a first valve member carried within said first bore for controlling interport fluid flow therein, and having a "float" and a "hold" position, in said "float" position said relay ports and said first load port respectively being placed in fluid communication with said first exhaust ports, and in said "hold" position said relay ports and said first load port respectively being closed to said exhaust ports thereby hydrostatically locking said fluid motors; and a second valve member carried within said second valve bore for controlling interport fluid flow therein, and having a normal position, in said normal position said pair of second load ports respectively being closed to said inlet ports and exhaust ports, while in said normal position said second valve system being automatically activated upon adjustment of said first valve member into the "hold" position, in the activated condition said second valve member being operable to control flow of power fluid between said double acting fluid motor and the pressure means.

9. The combination set forth in claim 8 wherein said first valve member has a "semifloat" position intermediate said "float" and "hold" positions, in said "semifloat" position said relay ports are closed to communication with said first exhaust port, while said first load port remains in fluid communication with one of said first exhaust ports; and wherein said second valve system is automatically activated upon adjustment of said first valve member into said "semifloat" position.

10. In a hydraulic system of the type having a single acting and a double acting fluid motor, and pressure means for supplying power fluid, a control valve means for selectively controlling fluid flow between said pressure means and said fluid motors, said control valve means comprising: a first valve system including a first valve spool bore having a first inlet port for receiving power fluid, a pair of relay ports, a plurality of first exhaust ports for returning fluid to said pressure means, and a first load port; a second valve system including a second valve spool bore having a second inlet port for receiving power fluid, a second exhaust port for returning fluid to said pressure means, and a pair of second load ports; passage means for connecting said second load ports respectively in fluid communication with said pair of relay ports; passage means for connecting said first load port in fluid communication with the single acting fluid motor; a first valve spool carried in said first valve spool bore for controlling interport fluid flow therein, said first valve spool having a "float" and a "hold" position, in said "float" position said relay ports and said second load port respectively being placed in fluid communication with the first exhaust ports, in said "hold"

position said relay ports and said first load port respectively being closed to the first exhaust ports; and a second valve spool carried within said second valve spool bore for controlling interport fluid flow therein, said second valve spool having a normal position and an operating position, in said normal position said pair of second load ports being closed to said second inlet ports and said second exhaust ports, upon adjustment of said first valve spool into said "hold" position, said second valve system being automatically activated wherein said second valve spool is shiftable out of the normal position into an operating position placing said second load ports respectively in fluid communication with said second inlet port and said second exhaust port to drive said double acting fluid motor.

11. The combination set forth in claim 10 including a biasing means for yieldably maintaining said second valve spool in said normal position; and wherein said first valve spool is adjustable from said "hold" position into an operating position maintaining said relay ports closed to said first exhaust ports and placing said first load port in fluid communication with said first inlet port thereby driving the single acting fluid motors.

12. In a hydraulic system of the type including a single acting hydraulic jack, a double acting hydraulic jack, and pressure means for supplying power fluid, a double valve control means for selectively directing pressurized fluid from said pressure means to said jacks, said control means comprising: a main valve body having an exhaust passage for returning fluid to said pressure means; first and second valve bores formed in said body, said first bore having a pair of relay ports respectively being connected in fluid communication with said double acting jack, an exhaust port communicating with said exhaust passage, a first inlet port for receiving power fluid from said pressure means, and a first load port connected in fluid communication with said single acting jack, said second bore having a second inlet port for receiving power fluid from the pressure means, an exhaust port communicating with said exhaust passage, and a pair of passage means for cross connecting said pair of second load ports respectively in fluid communication with pair of relay ports, and first and second valve members respectively carried within said first and second bores for controlling interport fluid flow therein, said first valve member having a "float" position wherein said relay ports and said first load port respectively are placed in fluid communication with said exhaust passage, said first valve member being adjustable out of said "float" position whereby said relay ports are isolated from said exhaust passage, upon closing said relay ports to said exhaust passage said second valve member being automatically activated to control fluid flow to and from said double acting jack by alternatively opening and closing said pair of second load ports respectively to fluid communication with said exhaust passage and second inlet port.

13. The combination set forth in claim 12 wherein said first valve member is adjustable out of said "float" position into a "semifloat" position closing said relay ports respectively to said exhaust passage and maintaining said first load port in fluid communication with said exhaust passage and thereby hydraulically locking said double acting jack and permitting free expansion and contraction of said single acting jack.

14. The combination set forth in claim 13 wherein said first valve member is shiftable from said "semifloat" position into a "hold" and thence into an "operating" position, in said "hold" position said first load port is closed to said exhaust passage thereby hydraulically locking said single acting jack, in said operating position said first load port is placed in communication with said first inlet port thereby directing power fluid to said single acting jack.

15. The combination set forth in claim 14 including an outlet port formed in said second bore, and passage means for cross connecting said outlet port and said first inlet port for delivering power fluid from said second valve bore to said first valve bore; and wherein said first inlet port is placed in fluid communication with said outlet port during the nonoperating position of said second valve member, and in the operating position of said second valve member said outlet port is closed to said inlet port thereby preventing delivery of pressurized fluid to said single acting jack during delivery of pressurized fluid to said double acting jack.

16. In a hydraulic system including a single acting hydraulic jack and a double acting hydraulic jack, each having a pair of relatively expansible and contractible elements; and means for supplying pressurized fluid including a reservoir and a pump; a double spool control valve means for selectively directing pressurized fluid between said pressure means to said jacks, said control valve means comprising: a main valve body, an inlet passage formed within said main valve body and connected to the pressure side of said pump; an exhaust passage formed within said valve body and connected to said reservoir; a first valve spool bore formed in said body and having a plurality of exhaust ports communicating with said exhaust passage, a first and a second relay port respectively being connected for fluid communication with said double acting jack, a first inlet port, and a first load port connected for fluid communication with said single acting jack; a second bore parallel to said first bore and having a plurality of exhaust ports communicating with said exhaust passage, second and third axially spaced inlet ports communicating respectively with said inlet passage, second and third load ports adjacent said inlet ports respectively, and an outlet port intermediate said inlet ports; fluid passage means for cross connecting said first and second relay ports respectively with said second and third load ports; fluid passage means for cross connecting said outlet port and said first inlet port; and first and second axially reciprocable valve spools respectively carried within said first and second bores for controlling interport fluid flow therein, said first valve spool having a "float" position wherein said first inlet port, said relay ports and said first load port respectively communicate with said exhaust passage, said first valve being shiftable from said "float" position into a "semifloat" position and thence to a "hold" position, in the "semifloat" position said relay ports are closed to said exhaust passage while said first load port remains open to the exhaust passage, in said "hold" position said first load port and said relay ports respectively are closed to said first exhaust passage, said first valve spool also being shiftable from the "hold" position into an "operating" position wherein said relay ports remain closed to said exhaust passage and said first load port is connected with said first inlet port, said second valve spool having a normal position and being automatically activated upon closing of said relay ports by said first valve spool, in said normal position the second and third load ports respectively are isolated from the inlet and exhaust passages and said first inlet port is connected with said outlet port, said second valve member being adjustable in one axial direction out of said "normal" position and into a first operating position wherein said second load port is placed in communication with said second inlet port while said third load port is placed in communication with said exhaust passage, said second valve spool also being adjustable in the opposite axial direction from the normal position and into a second operating position wherein said second load port is placed in communication with the exhaust passage and said third load port is placed in communication with said third inlet port, in each of said first and second operating positions said outlet port is closed to said second and third inlet ports.

17. In a self-propelled earth moving vehicle of the type having a two axle tractor unit articulated with a single axle trailing unit and being adapted to operate as a three axle vehicle and as a two axle vehicle alternatively, a fluid pressure system comprising: a weight transfer fluid motor means operatively interposed between said tractor and trailing units for tilting the former relative to the latter about a horizontal axis extending transversely of the vehicle; a pair of steering motor means operatively interposed between said tractor unit and trailing unit for controlling relative angling between said units about a vertical axis; fluid pressure means for supplying pressurized fluid; a control valve means for selectively controlling fluid flow between said fluid pressure means and said fluid motor means, said control valve means including an exhaust passage, and including a first valve system having a first inlet port for receiving power fluid from said pressure means, a relay port, and a first load port, said control valve means also including a second valve system having a second inlet port for receiving power fluid from said pressure means, and a pair of second load ports, fluid passage means for interconnecting one of said second load ports and one of said relay ports in fluid communication with each other and with one of said steering motor means; fluid passage means for interconnecting the other of said second load ports and the other of said relay ports in fluid communication with each other and with the other of said steering motor means; means for connecting said first load port in fluid communication with said weight transfer motor; a first valve member for controlling interport fluid flow within said first valve system and having a position wherein said relay ports and first load port respectively are placed in fluid communication with said exhaust passage, thereby permitting free movement of said steering and weight transfer motor means, said first valve member also being operative to close said relay ports from communication with the exhaust passage thereby hydrostatically locking said steering motor means; a second valve member for controlling interport flow within said second valve system, said second valve system being automatically activated upon the closing of said relay ports by said first valve member whereby said second valve member is operative to control fluid flow to and from said steering motor means.

18. In a hydraulic system of the type having first, second and third fluid motors, and means including a reservoir and pump for supplying pressurized fluid, a control valve means for selectively controlling fluid flow between said pressure means and said fluid motors, said control valve means comprising: a first valve system including a first valve bore, said bore having a first inlet port in fluid communication with the pressure side of said pump; a pair of relay ports in communication respectively with said first and second fluid motors, and a first load port in communication with said third fluid motor; a second valve system including a second valve bore having an inlet port in fluid communication with the pressure side of said pump, with the exhaust passage of said first valve system and a pair of second load ports cross connected respectively in constant fluid communication with said relay ports; exhaust passage means communicating with said first and second valve bores and said reservoir; a first valve member carried within said first bore for controlling interport flow therein and having an adjusted position wherein said relay ports and said first load port respectively are placed in fluid communication with said exhaust passage means; and a second valve member carried within said second valve bore for controlling interport flow therein and having a normal position wherein the said pair of second load ports is closed to said inlet and to said exhaust passage, upon closing of said relay ports from communication with said exhaust passage by said first valve member said second valve system being automatically activated whereby said second valve member controls fluid flow to and from said first and second fluid motors.

References Cited in the file of this patent
UNITED STATES PATENTS

| | | |
|---|---|---|
| 2,374,410 | Brumbaugh | Apr. 24, 1945 |
| 2,833,556 | Kling | May 6, 1958 |
| 2,885,022 | Rockwell | May 5, 1959 |